US008826662B2

(12) United States Patent
Ernst et al.

(10) Patent No.: US 8,826,662 B2
(45) Date of Patent: Sep. 9, 2014

(54) RANKINE CYCLE SYSTEM AND METHOD

(75) Inventors: Timothy C. Ernst, Columbus, IN (US);
Christopher R. Nelson, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 364 days.

(21) Appl. No.: 13/335,620

(22) Filed: Dec. 22, 2011

(65) Prior Publication Data

US 2012/0216762 A1 Aug. 30, 2012

Related U.S. Application Data

(60) Provisional application No. 61/426,872, filed on Dec. 23, 2010.

(51) Int. Cl.
*F01K 23/10* (2006.01)
*F01K 13/02* (2006.01)
*F01N 5/02* (2006.01)
*F01K 9/00* (2006.01)
*F01K 11/02* (2006.01)
*F02G 5/02* (2006.01)
*F01K 23/06* (2006.01)

(52) U.S. Cl.
CPC . *F01N 5/02* (2013.01); *F01K 9/003* (2013.01); *F01K 11/02* (2013.01); F01N 2240/02 (2013.01); *F02G 5/02* (2013.01); Y02T 10/16 (2013.01); Y02T 10/166 (2013.01); *F01K 23/065* (2013.01)
USPC .................................. 60/618; 60/660; 60/686

(58) Field of Classification Search
CPC ......... F01K 23/065; F01K 9/00; F01K 9/003; F01K 11/02; F01K 19/04
USPC ............ 60/614, 616, 618, 660, 670, 685–686
See application file for complete search history.

(56) References Cited

U.S. PATENT DOCUMENTS

| | | | |
|---|---|---|---|
| 3,232,052 A | 2/1966 | Ricard | |
| 3,789,804 A | 2/1974 | Aguet | |
| 4,009,587 A | 3/1977 | Robinson, Jr. et al. | |
| 4,017,283 A * | 4/1977 | Witt | ................................. 62/623 |
| 4,164,850 A | 8/1979 | Lowi, Jr. | |
| 4,197,719 A * | 4/1980 | Shaw | ........................... 62/324.1 |
| 4,204,401 A | 5/1980 | Earnest | |
| 4,232,522 A | 11/1980 | Steiger | |
| 4,267,692 A | 5/1981 | Earnest | |
| 4,271,664 A | 6/1981 | Earnest | |
| 4,347,705 A * | 9/1982 | Mirante | ........................... 60/651 |

(Continued)

FOREIGN PATENT DOCUMENTS

| | | |
|---|---|---|
| EP | 1 273 785 B1 | 5/2007 |
| JP | 60-222511 A | 11/1985 |

(Continued)

*Primary Examiner* — Hoang Nguyen
(74) *Attorney, Agent, or Firm* — Foley & Lardner LLP

(57) ABSTRACT

A Rankine cycle waste heat recovery system uses a receiver with a maximum liquid working fluid level lower than the minimum liquid working fluid level of a sub-cooler of the waste heat recovery system. The receiver may have a position that is physically lower than the sub-cooler's position. A valve controls transfer of fluid between several of the components in the waste heat recovery system, especially from the receiver to the sub-cooler. The system may also have an associated control module.

26 Claims, 3 Drawing Sheets

(56) References Cited

U.S. PATENT DOCUMENTS

| | | |
|---|---|---|
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |
| 5,649,513 A | 7/1997 | Kanda |
| 5,685,152 A | 11/1997 | Sterling |
| 5,771,868 A | 6/1998 | Khair |
| 5,806,322 A | 9/1998 | Cakmakci et al. |
| 5,915,472 A | 6/1999 | Takikawa et al. |
| 5,950,425 A | 9/1999 | Takahashi et al. |
| 6,014,856 A | 1/2000 | Bronicki et al. |
| 6,035,643 A | 3/2000 | Rosenblatt |
| 6,055,959 A | 5/2000 | Taue |
| 6,138,649 A | 10/2000 | Khair et al. |
| 6,301,890 B1 | 10/2001 | Zeretzke |
| 6,321,697 B1 | 11/2001 | Matsuda et al. |
| 6,324,849 B1 | 12/2001 | Togawa et al. |
| 6,393,840 B1 | 5/2002 | Hay |
| 6,494,045 B2 | 12/2002 | Rollins, III |
| 6,523,349 B2 | 2/2003 | Viteri |
| 6,571,548 B1 | 6/2003 | Bronicki et al. |
| 6,598,397 B2 | 7/2003 | Hanna et al. |
| 6,606,848 B1 | 8/2003 | Rollins, III |
| 6,637,207 B2 | 10/2003 | Konezciny et al. |
| 6,701,712 B2 | 3/2004 | Bronicki et al. |
| 6,715,296 B2 | 4/2004 | Bakran et al. |
| 6,745,574 B1 | 6/2004 | Dettmer |
| 6,748,934 B2 | 6/2004 | Natkin et al. |
| 6,751,959 B1 | 6/2004 | McClanahan et al. |
| 6,792,756 B2 | 9/2004 | Bakran et al. |
| 6,810,668 B2 | 11/2004 | Nagatani et al. |
| 6,817,185 B2 | 11/2004 | Coney et al. |
| 6,848,259 B2 | 2/2005 | Keller-Sornig et al. |
| 6,877,323 B2 | 4/2005 | Dewis |
| 6,880,344 B2 | 4/2005 | Radcliff et al. |
| 6,910,333 B2 | 6/2005 | Minemi et al. |
| 6,964,168 B1 | 11/2005 | Pierson et al. |
| 6,977,983 B2 | 12/2005 | Correia et al. |
| 6,986,251 B2 | 1/2006 | Radcliff et al. |
| 7,007,487 B2 | 3/2006 | Belokon et al. |
| 7,028,463 B2 | 4/2006 | Hammond et al. |
| 7,044,210 B2 | 5/2006 | Usui |
| 7,069,884 B2 | 7/2006 | Baba et al. |
| 7,117,827 B1 | 10/2006 | Hinderks |
| 7,121,906 B2 | 10/2006 | Sundel |
| 7,131,259 B2 | 11/2006 | Rollins, III |
| 7,131,290 B2 | 11/2006 | Taniguchi et al. |
| 7,159,400 B2 | 1/2007 | Tsutsui et al. |
| 7,174,716 B2 | 2/2007 | Brasz et al. |
| 7,174,732 B2 | 2/2007 | Taniguchi et al. |
| 7,191,740 B2 | 3/2007 | Baba et al. |
| 7,200,996 B2 | 4/2007 | Cogswell et al. |
| 7,225,621 B2 | 6/2007 | Zimron et al. |
| 7,281,530 B2 | 10/2007 | Usui |
| 7,325,401 B1 | 2/2008 | Kesseli et al. |
| 7,340,897 B2 | 3/2008 | Zimron et al. |
| 7,454,911 B2 | 11/2008 | Tafas |
| 7,469,540 B1 | 12/2008 | Knapton et al. |
| 7,578,139 B2 | 8/2009 | Nishikawa et al. |
| 7,665,304 B2 | 2/2010 | Sundel |
| 7,721,552 B2 | 5/2010 | Hansson et al. |
| 7,797,940 B2 | 9/2010 | Kaplan |
| 7,823,381 B2 | 11/2010 | Misselhorn |
| 7,833,433 B2 | 11/2010 | Singh et al. |
| 7,866,157 B2 | 1/2011 | Ernst et al. |
| 7,942,001 B2 | 5/2011 | Radcliff et al. |
| 7,958,873 B2 | 6/2011 | Ernst et al. |
| 7,997,076 B2 | 8/2011 | Ernst |
| 2002/0099476 A1 | 7/2002 | Hamrin et al. |
| 2003/0033812 A1 | 2/2003 | Gerdes et al. |
| 2003/0213245 A1 | 11/2003 | Yates et al. |
| 2003/0213246 A1 | 11/2003 | Coll et al. |
| 2003/0213248 A1 | 11/2003 | Osborne et al. |
| 2005/0076639 A1* | 4/2005 | Shirk et al. ............... 60/520 |
| 2005/0262842 A1 | 12/2005 | Claassen et al. |
| 2008/0289313 A1 | 11/2008 | Batscha et al. |
| 2009/0031724 A1 | 2/2009 | Ruiz |
| 2009/0090109 A1 | 4/2009 | Mills et al. |
| 2009/0121495 A1 | 5/2009 | Mills |
| 2009/0133646 A1 | 5/2009 | Wankhede et al. |
| 2009/0151356 A1 | 6/2009 | Ast et al. |
| 2009/0179429 A1 | 7/2009 | Ellis et al. |
| 2009/0211253 A1 | 8/2009 | Radcliff et al. |
| 2009/0320477 A1 | 12/2009 | Juchymenko |
| 2009/0322089 A1 | 12/2009 | Mills et al. |
| 2010/0018207 A1 | 1/2010 | Juchymenko |
| 2010/0071368 A1 | 3/2010 | Kaplan et al. |
| 2010/0083919 A1 | 4/2010 | Bucknell |
| 2010/0139626 A1 | 6/2010 | Raab et al. |
| 2010/0180584 A1 | 7/2010 | Berger et al. |
| 2010/0192569 A1 | 8/2010 | Ambros et al. |
| 2010/0229525 A1 | 9/2010 | Mackay et al. |
| 2010/0257858 A1 | 10/2010 | Yaguchi et al. |
| 2010/0263380 A1 | 10/2010 | Biederman et al. |
| 2010/0282221 A1 | 11/2010 | Le Lievre |
| 2010/0288571 A1 | 11/2010 | Dewis et al. |
| 2011/0005477 A1 | 1/2011 | Terashima et al. |
| 2011/0006523 A1 | 1/2011 | Samuel |
| 2011/0094485 A1 | 4/2011 | Vuk et al. |
| 2011/0209473 A1 | 9/2011 | Fritz et al. |
| 2012/0023946 A1 | 2/2012 | Ernst et al. |

FOREIGN PATENT DOCUMENTS

| | | |
|---|---|---|
| JP | 8-68318 A | 3/1996 |
| JP | 9-32653 A | 2/1997 |
| JP | 10-238418 A | 9/1998 |
| JP | 11-166453 A | 6/1999 |
| JP | 2005-36787 A | 2/2005 |
| JP | 2005-42618 A | 2/2005 |
| JP | 2005-201067 A | 7/2005 |
| JP | 2005-329843 A | 12/2005 |
| JP | 2008-240613 A | 10/2008 |
| JP | 2009-167995 A | 7/2009 |
| JP | 2009-191647 A | 8/2009 |
| JP | 2010-77964 A | 4/2010 |
| WO | 2009/098471 A2 | 8/2009 |

\* cited by examiner

RANKINE CYCLE SYSTEM AND METHOD

CROSS-REFERENCE TO RELATED APPLICATIONS

This application claims the benefit of priority to U.S. Provisional Patent Application No. 61/426,872, filed on Dec. 23, 2010 which is hereby incorporated by reference in its entirety.

STATEMENT REGARDING FEDERALLY SPONSORED RESEARCH OR DEVELOPMENT

This invention was made with government support under "Exhaust Energy Recovery," contract number DE-FC26-05NT42419 awarded by the Department of Energy (DOE). The government has certain rights in the invention.

TECHNICAL FIELD

This disclosure relates to a waste heat recovery system using a Rankine cycle. The waste heat recovery system uses a receiver with a fluid level lower than the fluid level of a sub-cooler of the waste heat recovery system. The disclosure also teaches a method of using the described configuration.

BACKGROUND

There is typically little space available in an engine compartment or chamber. Because of the need for various reservoirs, filters, and other elements or components to sit at or above a top portion of an engine, space at or above a top portion of an engine is typically less available than space along side an engine or below an engine. In an engine system using a Rankine cycle, a receiver in existing systems sits higher than the sub-cooler, which permits gravity feeding of the sub-cooler. However, because engines in some applications occupy a high position in an engine compartment or cavity, it may be difficult for a receiver to be in an optimal position.

SUMMARY

This disclosure provides a fluid management system for a Rankine cycle waste heat recovery system for an internal combustion engine. The fluid management system comprises a fluid circuit, a condenser positioned along the fluid circuit, a sub-cooler fluidly connected to the condenser and containing a liquid working fluid, and a receiver fluidly connected to the sub-cooler and containing the liquid working fluid. A level of the liquid working fluid in the receiver is lower than a level of the liquid working fluid in the sub-cooler throughout all operating conditions.

This disclosure also provides a waste heat recovery system for an internal combustion engine. The system comprises a working fluid circuit. The circuit includes a cooled condenser receiving a vaporized working fluid and operable to change the state of the vaporized working fluid to a liquid working fluid. A sub-cooler is fluidly connected to the condenser and receives the liquid working fluid. A pump is fluidly connected to the sub-cooler and operable to move the liquid working fluid from the sub-cooler. A heat exchanger is fluidly connected to a pump to receive the liquid working fluid and operable to transfer heat from a heat source to the liquid working fluid to convert the liquid working fluid to the vaporized working fluid, wherein the vaporized working fluid is at a high pressure. An energy conversion device is fluidly connected to the heat exchanger and operable to convert the high-pressure vaporized working fluid received from the heat exchanger to energy. The system also comprises a fluid management circuit fluidly connected to the working fluid circuit. The fluid management circuit includes a conversion device bypass valve fluidly connected to the heat exchanger in parallel to the energy conversion. A receiver is fluidly connected to the conversion device bypass valve. The receiver is placed at a physical location where the maximum liquid working fluid level in the receiver is lower than the minimum liquid working fluid in the condenser and the sub-cooler. The conversion device bypass valve is operable to fluidly connect the heat exchanger to the receiver, simultaneously disconnecting a direct path to the condenser from the heat exchanger and the receiver. The vaporized working fluid flowing from the heat exchanger forces the liquid working fluid to flow from the receiver to the sub-cooler.

This disclosure also provides a valve configuration for a Rankine cycle waste heat recovery system. The valve configuration comprises a heat exchanger, wherein the heat exchanger is a source of vaporized working fluid. The valve configuration also comprises a condenser, a sub-cooler fluidly connected to the condenser, a receiver fluidly connected to the sub-cooler, and a valve. The valve has a first position such that the valve fluidly connects the receiver to the condenser. The valve has a second position such that the valve fluidly connects the heat exchanger to the receiver. The valve has a third position such that the valve fluidly connects the heat exchanger to the condenser.

This disclosure also provides a waste heat management system, comprising a sub-cooler containing a liquid working fluid. The liquid working fluid in the sub-cooler has a first level. A receiver is fluidly connected to the sub-cooler and contains the liquid working fluid. The liquid working fluid in the receiver has a second level. A valve is fluidly connected to the receiver. The first level is higher than the second level. The valve is selectively operable to deliver vaporized working fluid to the receiver to apply pressure to the liquid working fluid in the receiver to force the liquid working fluid in the receiver to flow into the sub-cooler.

This disclosure also provides a method of controlling fluid flow through a waste heat recovery system. The method comprises generating vaporized fluid in a working fluid circuit from a liquid working fluid located in the working fluid circuit. The liquid working fluid has a level. The method also comprises providing the vaporized fluid to a working fluid management circuit connected in parallel to the working fluid circuit. The method also comprises determining that the level of the liquid working fluid in the working fluid circuit is different from an operationally desirable level. The method also comprises allowing the vaporized fluid to flow through the working fluid management circuit applying the vaporized fluid to the working fluid management circuit to force liquid working fluid in the working fluid management circuit to flow from the working fluid management circuit into the working fluid circuit, to change the level of the liquid working fluid in the working fluid circuit. The method also comprises terminating the flow of vaporized fluid through the working fluid management circuit when the liquid working fluid in the working fluid circuit has reached an operationally desirable level.

Advantages and features of the embodiments of this disclosure will become more apparent from the following detailed description of exemplary embodiments when viewed in conjunction with the accompanying drawings.

DETAILED DESCRIPTION

Applications of a Rankine cycle, which includes an organic Rankine cycle, for increasing the thermal efficiency of internal combustion engines are increasing. A Rankine cycle can convert a portion of heat energy that normally would be wasted in an internal combustion engine, such as exhaust gas heat energy and other engine heat sources (e.g., engine oil, exhaust gas, charge gas, water jackets), into energy that can perform useful work. In converting the captured heat energy into useful work, a portion of the waste heat energy can be recovered to enhance an engine's efficiency.

Figure 1:
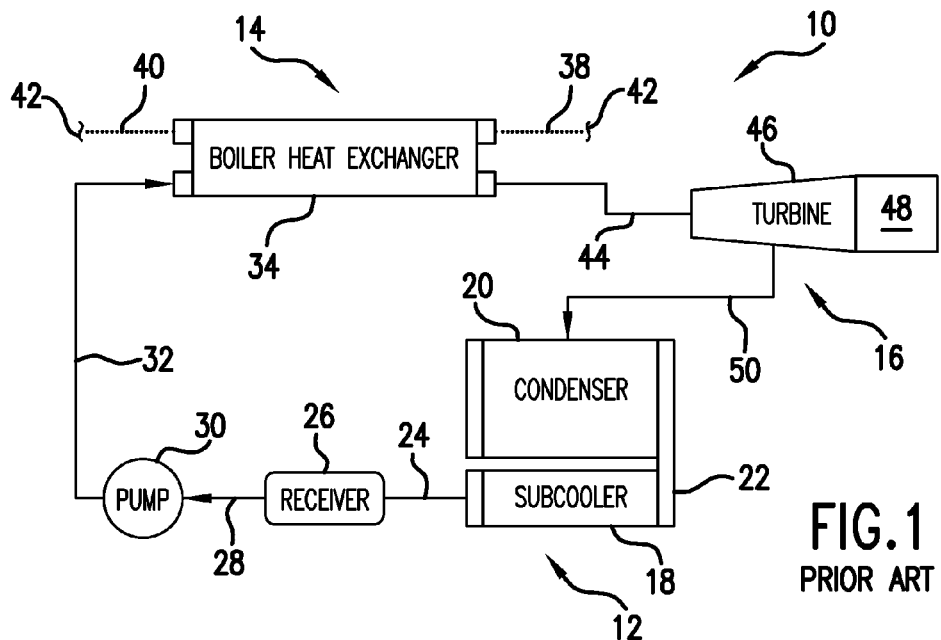
FIG. 1 is a simplified schematic of a conventional Rankine cycle waste heat recovery system.

Turning now to the figures, shown in FIG. 1 is a conventional Rankine cycle waste heat recovery system 10, or WHR system 10. WHR system 10 includes a working fluid circuit 12, which includes a heat exchange portion 14, and an energy capture portion 16.

Working fluid circuit 12 includes a sub-cooler 18, which may connect to a condenser 20 by way of a base plate 22. Connected to sub-cooler 18 by way of a receiver conduit 24 is a receiver 26. A pump conduit 28 connects a working fluid pump 30 with receiver 26. A heat exchanger conduit 32 connects pump 30 with a heat exchanger 34 of heat exchange portion 14.

Heat exchange portion 14 includes at least one heat exchanger, one of which may be a boiler heat exchanger 34. Though not shown, there may be additional heat exchangers between pump 30 and boiler heat exchanger 34. These additional heat exchangers may be any one of a plurality of heat exchangers, such as an exhaust heat exchanger, a pre-charge air cooler heat exchanger, a recuperator, or other heat exchangers that may benefit from an exchange of heat with the relatively cool liquid working fluid coming from working fluid circuit 12. These heat exchangers may be in series, parallel, or a combination of series and parallel. Boiler heat exchanger 34 may be an EGR boiler/superheater. In this example, boiler heat exchanger 34 would connect to the upstream side of an exhaust gas recirculation (EGR) system 42 by way of an EGR system conduit 38. Boiler heat exchanger 34 may also connect to the downstream side of EGR system 42 by way of an EGR conduit 40. A conversion device conduit 44 connects to a conversion device 46 of energy capture portion 16.

Conversion device 46 may connect to an auxiliary system 48. A condenser conduit 50 connects conversion device 46 with condenser 20 of working fluid circuit 12.

WHR system 10 works as follows. Sub-cooler 18 receives condensed working fluid from condenser 20 by way of base plate 22. Base plate 22 contains one or more fluid paths to connect condenser 20 to sub-cooler 18 fluidly. Condenser 20 may fluidly connect to sub-cooler 18 by conduits or other devices or mechanisms. Condenser 20 and sub-cooler 18 may also be a single integral unit. Liquid working fluid flows from sub-cooler 18 through receiver conduit 24 to receiver 26. Receiver 26 may act as a reservoir for liquid working fluid. Working fluid pump 30 pumps or pulls liquid working fluid from receiver 26 via pump conduit 28. Pump 30 then moves liquid working fluid through heat exchanger conduit 32 to boiler heat exchanger 34. Boiler heat exchanger 34 receives hot exhaust gas from EGR system 42 through EGR system conduit 38. Heat transfers from the hot exhaust gas to the liquid working fluid. The temperature of the hot exhaust gas is sufficient to cause the liquid working fluid received from heat exchanger conduit 32 to boil, turning the liquid working fluid into a high-pressure vapor. The heat transfer from the hot exhaust gas to the liquid working fluid cools the hot exhaust gas and the exhaust gas returns through EGR conduit 40 to EGR system 42.

High-pressure vaporized working fluid now flows through conversion device conduit 44 to conversion device 46. The vaporized working fluid cools and loses energy, which translates to decreased pressure, as it travels through conversion device 46. Conversion device 46 may drive an auxiliary system 48. The vaporized working fluid next flows through condenser conduit 50 to condenser 20. Condenser 20 may contain a plurality of passages through which vaporized working fluid and liquid working fluid may move. Cooling air or fluid flows across and possibly through condenser 20, passing over the plurality of passageways and decreasing the temperature of the vaporized working fluid to the point where the vaporized working fluid condenses to a liquid. The warm liquid working fluid flows through base plate 22 to return to sub-cooler 18, where the liquid working fluid may receive additional cooling from cooling air or fluid before repeating the above-described cycle.

The working fluid described in the configuration shown in FIG. 1 and in subsequent figures can be a non-organic or an organic working fluid. Some examples of working fluid are Genetron® R-245fa from Honeywell, Therminol®, Dowtherm J™ from Dow Chemical Co., Fluorinol® from American Nickeloid, toluene, dodecane, isododecane, methylundecane, neopentane, octane, water/methanol mixtures, and steam.

Figure 2:
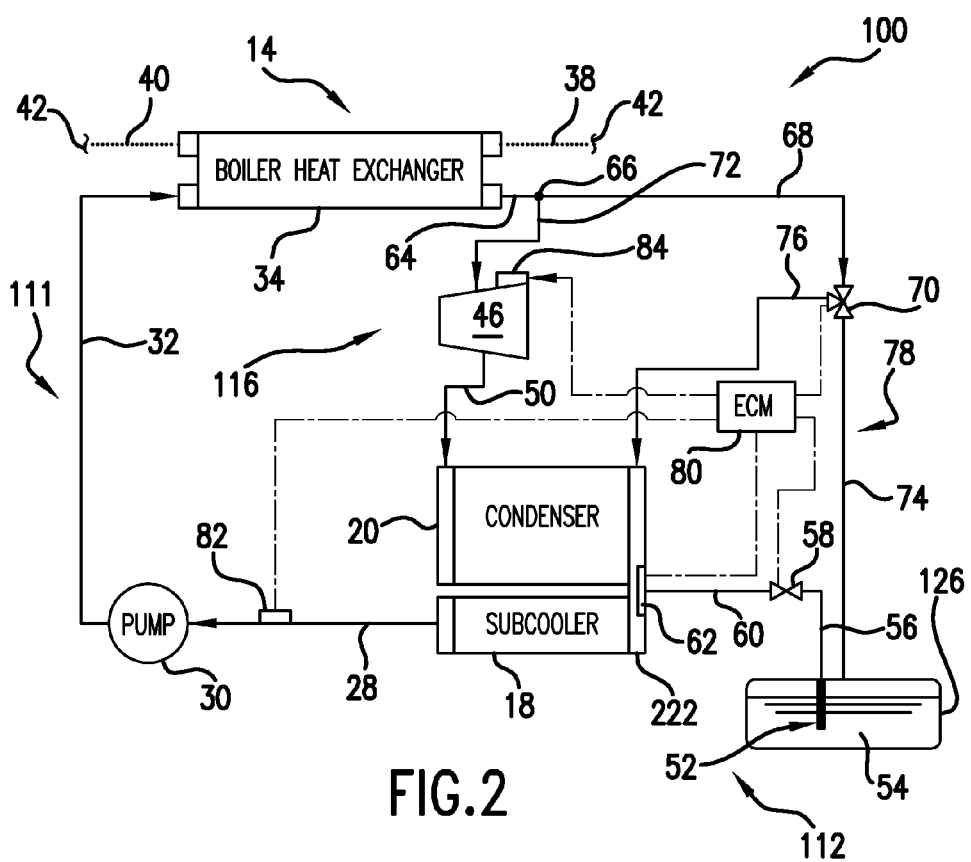
FIG. 2 is a simplified schematic of a Rankine cycle waste heat recovery system in accordance with an exemplary embodiment of the present disclosure.

Shown in FIG. 2 is an exemplary embodiment of the present disclosure. A Rankine cycle waste heat recovery system 100 that includes a working fluid circuit 111, which has, among other things, a heat exchange portion 14 and an energy capture portion 116, and, more importantly, a working fluid management system or circuit 112 fluidly connected to working fluid circuit 111 to achieve one or more operational and functional benefits and advantages described herein. Elements having the same number as the elements described in FIG. 1 behave as described in the previous discussion of FIG. 1. Discussion of these elements is only for clarity in discussion of the exemplary embodiment.

Heat exchange portion 14 includes at least one heat exchanger 34, which connects to working fluid pump 30 downstream from working fluid pump 30. Heat exchange circuit 14 also includes an EGR system 42, which is both upstream and downstream from heat exchanger 34, discussed in more detail hereinbelow. Downstream from heat exchange circuit 14 is an energy capture portion 116 and fluid management system 112. Heat exchange circuit 14 connects to an upstream side of a conversion device bypass valve 70 of fluid management system 112.

Energy capture portion 116 includes at least one energy conversion device 46, which may connect to an auxiliary device. Only a part of energy capture portion 116 appears in FIG. 2. Energy conversion device 46 of Rankine cycle WHR system 100 is capable of producing additional work or transferring energy to another device or system. For example, energy conversion device 46 can be a turbine that rotates as a result of expanding working fluid vapor to provide additional work, which can be fed into the engine's driveline to supplement the engine's power either mechanically or electrically (e.g., by turning a generator), or it can be used to power electrical devices, parasitic or a storage battery (not shown). Alternatively, the energy conversion device can be used to transfer energy from one system to another system (e.g., to transfer heat energy from WHR system 100 to a fluid for a heating system).

Energy capture portion 116 connects to heat exchange circuit 14 downstream from heat exchange circuit 14. More specifically, energy capture portion 116 connects to heat exchanger 34 downstream from heat exchanger 34. Energy capture portion 116 connects to an upstream side of condenser 20.

Working fluid management circuit 112 includes a receiver 126, conversion device bypass valve 70, and a shutoff valve 58. Sub-cooler 18 and condenser 20 provide functions for both working fluid circuit 111 and working fluid management circuit 112 and may be considered part of the opposite circuit when describing transfer of fluid and vapor. Receiver 126 is connected to condenser 20 and sub-cooler 18, which may be considered either upstream or downstream of receiver 126, as will be explained in more detail hereinbelow. Upstream of receiver 126 is conversion device bypass valve 70. Connected downstream from sub-cooler 18 is working fluid pump 30.

Positioned within receiver 126 is a dip tube 52. Dip tube 52 extends below the surface of a liquid working fluid 54. A dip tube conduit 56 connects dip tube 52 to shutoff valve 58. A shutoff valve conduit 60 connects shutoff valve 58 to a base plate 222. Base plate 222 serves to connect condenser 20 to sub-cooler 18 fluidly as well as providing a location for liquid working fluid level sensor 62. Because receiver 126 connects to base plate 222, sub-cooler 18 connects directly to an upstream side of working fluid pump 30 by way of pump conduit 28. Receiver 126 is placed or positioned relative to sub-cooler 18 so that when liquid working fluid 54 is at a maximum level in receiver 126, the level of liquid working fluid 54 in receiver 126 is lower than the minimum level of liquid working fluid 54 in sub-cooler 18. Thus, throughout operation of WHR system 100, the top surface or level of the working fluid in receiver 126 will always be vertically lower than the top surface or level of working fluid in sub-cooler 18, under all operating conditions. One method of meeting this condition is to place receiver 126 so that it is physically located lower than both condenser 20 and sub-cooler 18.

Heat exchanger conduit 32 connects a downstream side of pump 30 to boiler heat exchanger 34, which functions in a manner previously described. An outlet conduit 64 connects a downstream side of boiler heat exchanger 34 to a junction 66. A conversion device bypass conduit 68 connects junction 66 to an upstream side of conversion device bypass valve 70, which is part of working fluid management system 112. A conversion device conduit 72 connects a downstream side of junction 66 to expander conversion device 46, which may drive auxiliary system 48 and connects to an upstream side of condenser 20 by way of condenser conduit 50. Since conversion device bypass conduit 68 and conversion device conduit 72 both connect to junction 66, they fluidly connect to junction 66 in parallel to each other. Conversion device bypass valve 70 connects to an upstream side of receiver 126 by way of receiver conduit 74. Conversion device bypass valve 70 also connects to an upstream side of condenser 18 by way of a vent and bypass conduit 76. As will be seen, conversion device bypass valve 70 is in a configuration that provides certain operational benefits to WHR system 100.

WHR system 100 works as follows. Sub-cooler 18 stores liquid working fluid 54. Pump 30 operates to pull liquid working fluid 54 from sub-cooler 18 by way of pump conduit 28. Pump 30 then pushes liquid working fluid 54 through heat exchanger conduit 32 to boiler heat exchanger 34. Boiler heat exchanger 34 works as previously described. High-pressure vaporized working fluid 54 exits boiler heat exchanger 34 through outlet conduit 64, traveling to junction 66. The vaporized working fluid then has the opportunity to travel through two paths, as will be seen.

Vaporized working fluid travels from junction 66 through conversion device conduit 72 to conversion device 46, which works as previously described. From conversion device 46, vaporized working fluid travels through condenser conduit 50 to return to condenser 20, wherein cooling air or liquid flowing through condenser 20 causes the temperature of the vaporized working fluid to decrease so that the vaporized working fluid condenses and becomes liquid working fluid 54. Liquid working fluid 54 returns to sub-cooler 18 by way of base plate 222, which has fluid passages (not shown) formed therein.

Figure 3A:
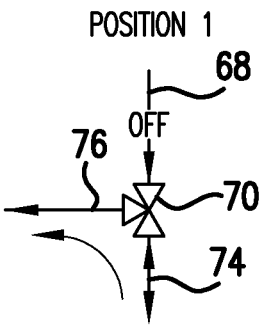
FIG. 3A is a schematic view of a conversion device bypass valve of the Rankine cycle waste heat recovery system of FIG. 2 in a first position.

Returning to junction 66, vaporized working fluid can also flow through conversion device bypass conduit 68 to conversion device bypass valve 70 when conversion device bypass valve 70 permits such flow, as will be described in more detail hereinbelow. Conversion device bypass valve 70 has three positions. These three positions connect to various elements of WHR system 100, as has been previously described, in specific configurations. In a first position, shown in FIG. 3A, conversion device bypass valve 70 connects receiver conduit 74 with vent and bypass conduit 76. Conversion device bypass valve 70 blocks conversion device bypass conduit 68 when conversion device bypass valve 70 is in the first position. In this configuration, which is the position bypass valve 70 is likely to occupy for most of its operational time, provides venting for receiver 126 to permit vapor to flow between receiver 126 to condenser 20.

Because of the position of receiver 126 and the absence of pressure in receiver conduit 74 and the upper portion of receiver 126, liquid working fluid 54 may drain by gravity into receiver 126 through shutoff valve conduit 60, shutoff valve 58, dip tube conduit 56 and then dip tube 52, if there is excess liquid working fluid in sub-cooler 18 and condenser 20. Thus, while receiver 126 is fluidly upstream of sub-cooler 18 and condenser 20, in some circumstances it may be downstream of sub-cooler 18 as fluid drains from sub-cooler 18 and condenser 20 by the force of gravity into receiver 126. Shutoff valve 58 is normally open during operation of WHR system 100. However, shutoff valve 58 may close during system shutdown to isolate receiver 126 and during certain operating modes to increase the level of liquid working fluid 54 in sub-cooler 18 and condenser 20. The position of receiver 126 is beneficial to placement of receiver 126 in a vehicle. As previously noted, space in an engine compartment or chamber (not shown) is typically unavailable in many areas, particularly near the top portion of such a compartment or chamber. Because receiver 126 is positioned lower than the other components of WHR system 100, it is easier to incorporate WHR system 100 in an engine system.

Figure 3B:
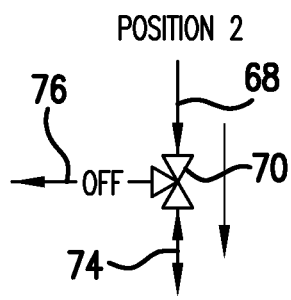
FIG. 3B is a schematic view of a conversion device bypass valve of the Rankine cycle waste heat recovery system of FIG. 2 in a second position.

In a second position, shown in FIG. 3B, conversion device bypass valve 70 connects conversion device bypass conduit 68 with receiver conduit 74. Conversion device bypass valve 70 blocks vent and bypass conduit 76 when conversion device bypass valve 70 is in the second position. In the second position, vaporized working fluid flows through receiver conduit 74 into receiver 126. Because the vaporized working fluid is under pressure, and because dip tube 52 is below the surface of liquid working fluid 54, the vaporized working fluid forces liquid working fluid 54 into dip tube 52. From dip tube 52, liquid working fluid 54 flows into dip tube conduit 56, through shutoff valve 58, through shutoff valve conduit 60, and then into base plate 222, where liquid working fluid 54 then flows to sub-cooler 18 to raise the level of liquid working fluid 54 in sub-cooler 18. Once the level of liquid working fluid 54 is at an appropriate or operationally desirable level, which working fluid level sensor 62 determines by sensing or detecting a parameter of the working fluid, for example the level, temperature or pressure of the working fluid, then conversion device bypass valve 70 will return to either the first position or a third position, described hereinbelow, terminating flow of vaporized working fluid through working fluid management circuit 112.

It should be apparent from the foregoing description that working fluid management circuit 112 operates to adjust the level of the liquid working fluid in the working fluid circuit 111. When the level of the liquid working fluid is too high, which may be determined one or more sensors, for example, sensor 62 or sensor 85, fluid may drain from working fluid circuit 111 through valve 58 of working fluid management circuit 112 into working fluid management circuit 112. Conversely, when the level of the liquid working fluid in working fluid circuit 111 is too low, which one or more sensors, for example, sensor 62 or sensor 85, then conversion device bypass valve 70 in fluid management circuit 112 is set to force liquid working fluid from working fluid management circuit 112 to working fluid circuit 111, increasing the level of the working fluid in working fluid circuit 111.

Figure 3C:
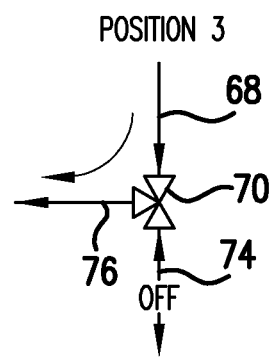
FIG. 3C is a schematic view of a conversion device bypass valve of the Rankine cycle waste heat recovery system of FIG. 2 in a third position.

In the third position, shown in FIG. 3C, conversion device bypass valve 70 connects conversion device bypass conduit 68 with vent and bypass conduit 76. Conversion device bypass valve 70 blocks receiver conduit 74 when conversion device bypass valve 70 is in the third position. One benefit to this third position is that pressure spikes, peaks or transients resulting from the expansion of working fluid as it vaporizes may bypass conversion device 46, decreasing the stress on conversion device 46. Bypassing conversion device 46 means that high pressure vaporized working fluid is diverted around conversion device 46 or routed to condenser 20 directly, increasing the heat load on condenser 20 and increasing the heat rejection requirement for condenser 20. The increased pressure and temperature in condenser 20, which fluidly connects to sub-cooler 18, causes liquid working fluid 54 to be under increased or greater pressure as it flows through pump conduit 28 to pump 30. The increased pressure of liquid working fluid 54 as it flows toward pump 30 provides benefits, which includes increasing the cavitation margin of the pump by increasing the working fluid sub-cooling (the degrees of temperature below the saturation temperature for the measured pressure), which assists pump 30 in maintaining prime, or the ability to move fluid.

Though the description of conversion device bypass valve 70 has been in terms of discrete positions, conversion device bypass valve 70 may operate as a proportional valve movable to partial open/closed positions or may be modulated or cycled rapidly between positions, also called binary operation or modulation. Thus, conversion device bypass valve 70 may operate in a way to gain the benefit of all three positions by cycling through the positions quickly, with a dwell time in any one position of tenths of second.

WHR system 100 has a number of functions that an automatic system may control. Referring again to FIG. 2, in addition to the previously described systems and components is a control system 78. Control system 78 includes a plurality of sensors and a control module 80. Control module 80 may be an electronic control unit or electronic control module (ECM) that monitors the performance of an internal combustion engine in which WHR system 100 is located or may monitor other vehicle conditions. Control module 80 may also be either a single unit or multiple control units that may communicate with each other or with yet another control module or unit. Control module 80 may also be a digital or analog circuit.

A plurality of sensors 82 associated with pump conduit 28 sends temperature and pressure information to control module 80. Note that while lines are shown in FIG. 2 to denote connections, such connections may be via wire, cable, fiber optics, wireless, power path and other techniques for transmitting a signal from a sensor and receiving that signal. Control module 80 also receives temperature and pressure information from sensors 84 associated with conversion device 46. Working fluid level sensor 62 also transmits data to control module 80. Control module 80 may receive inputs from other sensors to aid in refined control of WHR system 100.

In addition to receiving sensor inputs, control module 80 may send signals to one or more devices for control of those devices. For example, control module 80 connects to shutoff valve 58 and to conversion device bypass valve 70 to operate those valves, using the information gathered from the plurality of sensors described above and possibly information stored within control module 80 or other databases or storage devices.

Control module 80 may include a processor or the equivalent and modules in the form of software or routines stored on electronically readable media such as memory, which the processor of control module 80 executes. For example, instructions for carrying out the processes shown in FIG. 2 may be stored integrally with control module 80 or stored elsewhere, but accessible by control module 80. In alternative embodiments, portions of control module 80 may include electronic circuits for performing some or all of the processing. These electronic circuits may be analog or digital. These modules may include a combination of software, electronic circuits and microprocessor based components. Control module 80 may be a module specifically designed for this application. Control module 80 may receive data indicative of engine performance and exhaust gas composition including, but not limited to, engine position sensor data, speed sensor data, exhaust mass flow sensor data, fuel rate data, pressure and temperature sensor data from one or more locations of an engine (not shown) and an associated exhaust aftertreatment system (not shown), data regarding requested power, and other data. Control module 80 may then generate control signals and output these signals to control elements of WHR system 100, an engine, an associated aftertreatment system, and other systems and devices associated with a vehicle or other system using the engine. Note that some engines incorporating WHR system 100 may be in a fixed location, providing primary or backup power for a stationary facility. Some engines incorporating WHR system 100 may be in a marine application, thus the term vehicle should be considered a broad term covering any mobile application.

Figure 4:
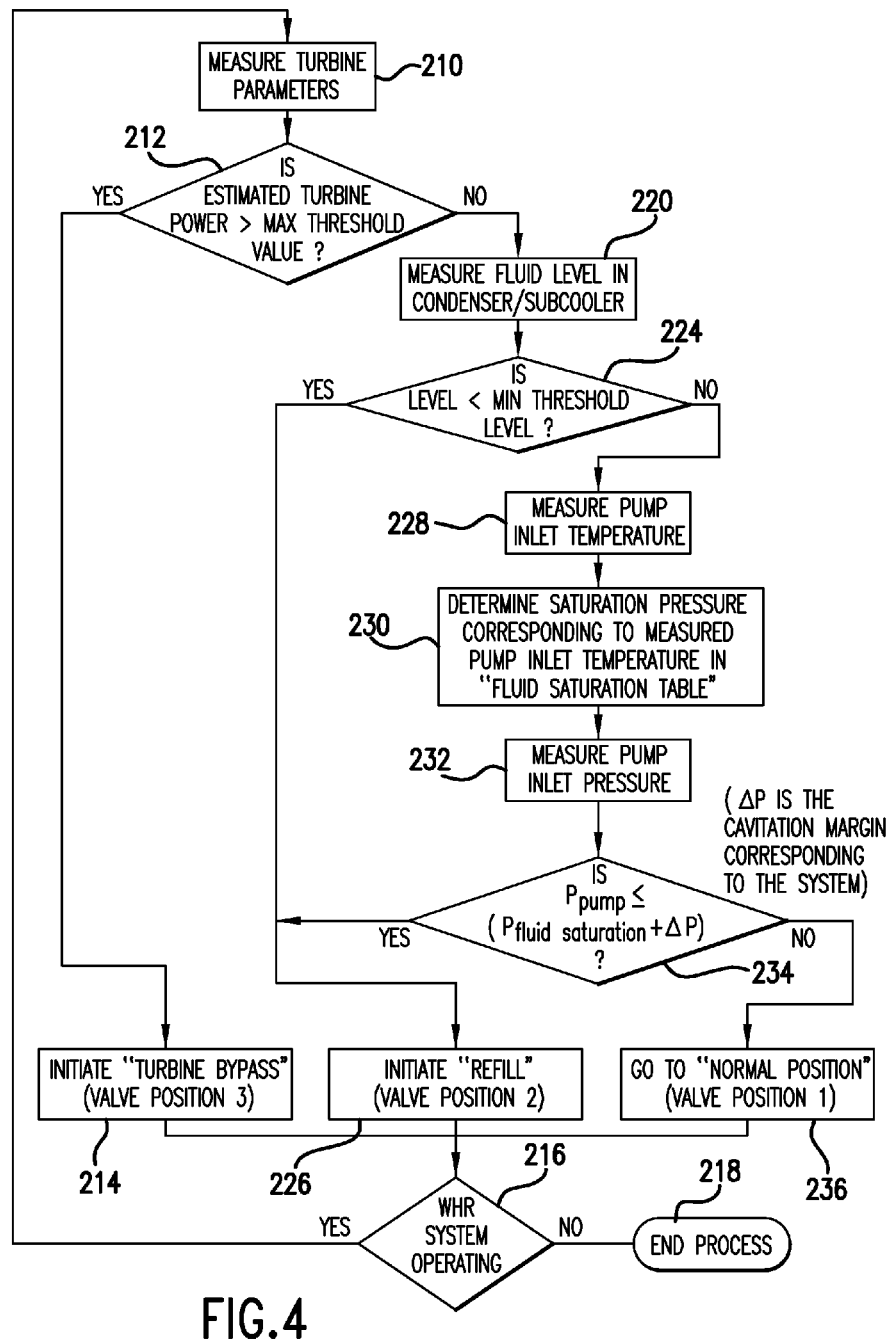
FIG. 4 is a flow diagram of the control configuration of FIG. 2.

Referring now to FIG. 4, a flow chart is shown that describes a process that may be used to determine the various valve positions of the three-way conversion device bypass valve 70. The flow chart uses the term "turbine" as an exemplary embodiment of a conversion device. The process begins with step 210, where control module 80 receives signals from various sensors provided in WHR system 100, particularly sensors 84 that measure parameters of conversion device 46.

The received signals are used to determine whether the estimated conversion device power is greater than a maximum threshold value in decision step 212. If the estimated conversion device power is greater than the maximum threshold value, the process moves to step 214 where control module 80 will move conversion device bypass valve 70 to the third position. As previously described, when conversion device bypass valve 70 is in the third position some of the high-pressure vaporized working fluid is bypassed around conversion device 46 by way of conversion device bypass conduit 68 and vent and bypass conduit 76, thus decreasing the amount of vaporized working fluid moving through conversion device 46, thereby decreasing the amount of energy imparted to conversion device 46. The process may move to decision step 216 next.

At step 216, the control module determines whether the engine (not shown) and thus WHR system 100 is still operating. If WHR system 100 is still operating, then the process will return to step 210. If WHR system 100 is no longer operating, then the process will move to a termination step 218. This description is confined to a limited portion of the operation of an engine. The entire process may be much more complex and involve many more steps, either preceding step 210 or extending beyond the steps that determine the position of conversion device bypass valve 70. Thus, the flow chart shown in FIG. 4 is a reflection only of the general nature of the steps that need to be accomplished to operate the elements of WHR system 100 shown in FIG. 2 rather than a comprehensive list of all possible steps needed to operate an engine or all elements of WHR system 100.

Returning now to step 212, if the estimated conversion device power is less than a maximum threshold valve, as determined using information from sensors 84 associated with conversion device 46, then the process moves to step 220, where the level of liquid working fluid 54 in condenser 20 and sub-cooler 18 is measured by using information from working fluid level sensor 62. The process then moves to decision step 224. If the level of working fluid 54 in condenser 20 and sub-cooler 18 is less than a minimum threshold level, then the process moves to step 226. At step 226, control module 80 commands conversion device bypass valve 70 to the second position. As previously described, in the second position conversion device bypass valve 70 connects conversion device bypass conduit 68 with receiver conduit 74. A portion of the high-pressure vaporized working fluid from boiler heat exchanger 34 will then flow to receiver 126, forcing liquid working fluid 54 through dip tube 52 into dip tube conduit 56. Liquid working fluid 54 then flows through shut-off valve 58 and then shutoff valve conduit 60. Liquid working fluid 54 then flows into base plate 222 and then flows into sub-cooler 18, restoring the level of liquid working fluid 54 to a desired level.

While the conversion device bypass valve 70 is causing the flow of liquid working fluid 54, the process moves to step 216 where the process determines whether WHR system 100 is continuing to operate. As before, if WHR system 100 is shutting down, then the process will terminate. If WHR system 100 is continuing to operate, then the process returns to step 100. Eventually, decision step 224 will indicate that the level of liquid working fluid 54 has reached a minimum threshold level in sub-cooler 18 and condenser 20. When that happens, the process moves to step 228.

At step 228, control module 80 receives the temperature of liquid working fluid 54 at the inlet of pump 30 from sensors 82, which defines $T_{pump}$. The process then moves to step 230, where control module 80 refers to a "fluid saturation table" to determine the saturation pressure corresponding to $T_{pump}$, which defines $P_{fluid\ saturation}$. The process then moves to step 232. At step 232, control module 80 receives the inlet pressure of liquid working fluid 54 at pump 30 from sensors 82, which defines $P_{pump}$. The process then moves to decision step 234. At decision step 234 a comparison is made between $P_{pump}$ and $P_{fluid\ saturation}$. $P_{pump} < P_{fluid\ saturation}$, then the process proceeds to step 226 to move conversion device bypass valve 70 to the second position. This comparison may be modified by $\Delta P$, which is the cavitation margin for WHR system 100, particularly for pump 30. The comparison would then be $P_{pump} < P_{fluid\ saturation} + \Delta P$. The operation of the process at step 226 and the effect of conversion device bypass valve 70 being in the second position has been discussed hereinabove.

Returning to decision step 234, if the process determines that $P_{pump} < P_{fluid\ saturation} + \Delta P$ is not true, then the process proceeds to step 236. At step 236, control module 80 moves conversion device bypass valve 70 to the first position. In the first position, which is likely to be the most common or typical position for conversion device bypass valve 70, conversion device bypass valve 70 connects receiver conduit 74 with vent and bypass conduit 76. The process then moves to decision step 216, which operates as previously described.

Thus, this disclosure describes a system and method that uses a gravity drain low mount receiver 126 in a Rankine cycle or an organic Rankine cycle. High vapor pressure regulates the level of liquid working fluid 54 in condenser 20 and sub-cooler 18 by forcing liquid working fluid 54 from receiver 126 to condenser 20 and sub-cooler 18 when needed without the need for a pump in receiver 126. The conversion device bypass valve 70 has a combined functionality that includes regulation of the inventory of liquid working fluid 54 in receiver 126 and power limiting of conversion device 46. This configuration solves packaging concerns related to receiver 126 in mobile applications, though the benefits of the present disclosure may apply to stationary applications as well.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A fluid management system for a Rankine cycle waste heat recovery system for an internal combustion engine, the fluid management system comprising:
    a fluid circuit;
    a condenser positioned along the fluid circuit;
    a sub-cooler fluidly connected to the condenser and containing a liquid working fluid;
    a receiver fluidly connected to the sub-cooler and containing the liquid working fluid, wherein a level of the liquid working fluid in the receiver is lower than a level of the liquid working fluid in the sub-cooler throughout all operating conditions; and
    a valve positioned along the fluid circuit upstream of the condenser and movable into a first position and a second position,
    wherein the valve second position fluidly connects a source of high-pressure vaporized working fluid to the receiver, and
    wherein the high-pressure vaporized working fluid causes the liquid working fluid in the receiver to flow from the receiver to the sub-cooler.

2. The system of claim 1, further including a pump fluidly connected to the sub-cooler and connected to at least one heat exchanger, wherein the pump is operable to move the liquid working fluid in the sub-cooler to the at least one heat exchanger.

3. The system of claim 2, wherein the at least one heat exchanger is the source of the high-pressure vaporized working fluid.

4. The system of claim 2, wherein the at least one heat exchanger receives exhaust gas from an exhaust gas recirculation system.

5. The system of claim 3, wherein the at least one heat exchanger heats the liquid working fluid and changes the state of the liquid working fluid to the high-pressure vaporized working fluid.

6. The system of claim 1, wherein the valve first position fluidly connects the receiver to the condenser.

7. The fluid management system of claim 1, wherein the valve includes a third position and the valve third position connects the source of high-pressure vaporized working fluid to the condenser.

8. The system of claim 1, wherein the receiver is physically located in a position that is lower than the sub-cooler's position.

9. A waste heat recovery system for an internal combustion engine, the waste heat recovery system comprising:
  a working fluid circuit, including:
    a cooled condenser receiving a vaporized working fluid and operable to change the state of the vaporized working fluid to a liquid working fluid;
    a sub-cooler fluidly connected to the condenser and receiving the liquid working fluid;
    a pump fluidly connected to the sub-cooler and operable to move the liquid working fluid from the sub-cooler;
    a heat exchanger fluidly connected to a pump to receive the liquid working fluid and operable to transfer heat from a heat source to the liquid working fluid to convert the liquid working fluid to the vaporized working fluid, wherein the vaporized working fluid is at a high pressure; and
    an energy conversion device fluidly connected to the heat exchanger and operable to convert the high-pressure vaporized working fluid received from the heat exchanger to energy; and
  a fluid management circuit fluidly connected to the working fluid circuit, the fluid management circuit including:
    a conversion device bypass valve fluidly connected to the heat exchanger in parallel to the energy conversion device; and
    a receiver fluidly connected to the conversion device bypass valve, wherein the receiver is placed at a physical location where the maximum liquid working fluid level in the receiver is lower than the minimum liquid working fluid level in the condenser and the sub-cooler;
  wherein the conversion device bypass valve is operable to fluidly connect the heat exchanger to the receiver, simultaneously disconnecting a direct path to the condenser from the heat exchanger and the receiver; and
  wherein vaporized working fluid flowing from the heat exchanger forces the liquid working fluid to flow from the receiver to the sub-cooler.

10. The waste heat recovery system of claim 9, wherein the position of the receiver is physically lower than the position of condenser and the sub-cooler.

11. The waste heat recovery system of claim 9, wherein the conversion device bypass valve is alternatively operable to connect the receiver to the condenser fluidly, simultaneously blocking fluid connections through the conversion device bypass valve to the heat exchanger.

12. The waste heat recovery system of claim 9, wherein the conversion device bypass valve is alternatively operable to connect the heat exchanger to the condenser, simultaneously blocking fluid connections through the conversion device bypass valve to the receiver.

13. The waste heat recovery system of claim 9, wherein the heat exchanger receives exhaust gas from an exhaust gas recirculating system.

14. The waste heat recovery system of claim 9, further including a control module, wherein the control module monitors the liquid working fluid level in the sub-cooler and commands the conversion device bypass valve to be in the position that fluidly connects the heat exchanger to the receiver when the level of the liquid working fluid in the sub-cooler is less than a level established by a process stored within the control module.

15. The waste heat recovery system of claim 9, further including a control module, wherein the control module monitors the temperature and pressure of the liquid working fluid flowing to the pump and wherein when the pressure of the liquid working fluid flowing to the pump is less than a fluid saturation pressure determined by the temperature of the liquid working fluid flowing to the pump the control module commands the conversion device bypass valve to move to a position that fluidly connects the heat exchanger to the receiver.

16. A valve configuration for a Rankine cycle waste heat recovery system, the valve configuration comprising:
  a heat exchanger, wherein the heat exchanger is a source of vaporized working fluid;
  a condenser;
  a sub-cooler fluidly connected to the condenser;
  a receiver fluidly connected to the sub-cooler; and
  a valve;
  wherein the valve has a first position such that the valve fluidly connects the receiver to the condenser;
  wherein the valve has a second position such that the valve fluidly connects the heat exchanger to the receiver; and
  wherein the valve has a third position such that the valve fluidly connects the heat exchanger to the condenser.

17. The valve configuration of claim 16, wherein the heat exchanger receives an exhaust gas from an exhaust gas recirculation system.

18. The valve configuration of claim 16, wherein the receiver contains a liquid working fluid and wherein when the valve is in the second position, the valve directs vaporized working fluid to the receiver, forcing liquid working fluid contained within the receiver through a conduit into the sub-cooler.

19. The valve configuration of claim 16, wherein the receiver has a physical location that is lower than the position of the sub-cooler.

20. A waste heat management system, comprising:
  a sub-cooler containing a liquid working fluid, wherein the liquid working fluid in the sub-cooler has a first level;
  a receiver fluidly connected to the sub-cooler and containing the liquid working fluid, wherein the liquid working fluid in the receiver has a second level; and
  a valve fluidly connected to the receiver;
  wherein the first level is higher than the second level; and
  wherein the valve is selectively operable to deliver vaporized working fluid to the receiver to apply pressure to the liquid working fluid in the receiver to force the liquid working fluid in the receiver to flow into the sub-cooler.

21. The waste heat management system of claim 20, further comprising a heat exchanger, wherein the pressure is from vaporized working fluid received from the heat exchanger.

22. A method of controlling fluid flow through a waste heat recovery system, the method comprising:

generating vaporized fluid in a working fluid circuit from a liquid working fluid located in the working fluid circuit, wherein the liquid working fluid has a level;

providing the vaporized fluid to a working fluid management circuit connected in parallel to the working fluid circuit;

determining that the level of the liquid working fluid in the working fluid circuit is different from an operationally desirable level;

allowing the vaporized fluid to flow through the working fluid management circuit to force liquid working fluid in the working fluid management circuit to flow from the working fluid management circuit into the working fluid circuit, to change the level of the liquid working fluid in the working fluid circuit; and terminating the flow of vaporized fluid through the working fluid management circuit when the liquid working fluid in the working fluid circuit has reached an operationally desirable level.

23. The method of claim 22, wherein the working fluid management circuit includes a receiver and wherein the working fluid circuit includes a condenser and a sub-cooler, and the liquid working fluid moves between the receiver and the condenser, and the sub-cooler.

24. The method of claim 23, wherein the receiver is positioned so that the maximum level of the liquid working fluid in the receiver is lower than minimum level of the liquid working fluid in the condenser and the sub-cooler.

25. The method of claim 24, wherein the receiver is physically positioned lower than the condenser and the sub-cooler.

26. The method of claim 22, wherein the vaporized fluid is selectively applied to the working fluid management circuit by a valve.

* * * * *